United States Patent [19]

Smith, Jr.

[11] 4,177,301

[45] Dec. 4, 1979

[54] PRIMER COMPOSITIONS FOR ADHERING SILICONE COMPOSITIONS

[75] Inventor: Alfred H. Smith, Jr., Ballston Lake, N.Y.

[73] Assignee: General Electric Company, Waterford, N.Y.

[21] Appl. No.: 863,118

[22] Filed: Dec. 22, 1977

Related U.S. Application Data

[62] Division of Ser. No. 736,381, Jan. 28, 1977.

[51] Int. Cl.² .......................... B05D 1/36; B05D 7/02
[52] U.S. Cl. ............................... 427/401; 427/407 C; 427/407 D; 427/407 E; 427/407 F; 427/407 G; 428/447
[58] Field of Search ........... 427/407 C, 407 D, 407 E, 427/407 F, 407 G, 401

[56] References Cited

U.S. PATENT DOCUMENTS

| | | | |
|---|---|---|---|
| 3,317,369 | 5/1967 | Clark et al. | 260/827 X |
| 3,453,136 | 7/1969 | Bylsma | 526/279 X |
| 3,453,230 | 7/1969 | Plueddeman | 260/41 |
| 3,706,697 | 12/1972 | Backderf | 260/827 X |
| 3,707,518 | 12/1972 | Bemmels et al. | 526/279 X |
| 3,888,815 | 6/1975 | Bessmer et al. | 260/37 SB |
| 3,951,893 | 4/1976 | Gander | 526/279 X |
| 4,043,953 | 8/1977 | Chang et al. | 260/827 X |

*Primary Examiner*—James R. Hoffman
*Attorney, Agent, or Firm*—E. Philip Koltos; John L. Young; Philip L. Schlamp

[57] ABSTRACT

There is provided by the present invention a method for adhering silicone compositions to various substrates and more specifically to plastic substrates by the utilization of a primer composition which is a reaction product of methyl or butyl methacrylate or butyl acrylate and an acrylate functional silane, where in such reaction product mixture there is some of the acrylate functional silane monomer present.

8 Claims, No Drawings

PRIMER COMPOSITIONS FOR ADHERING SILICONE COMPOSITIONS

This application is a division of copending application Ser. No. 736,381 filed Jan. 28, 1977.

BACKGROUND OF THE INVENTION

The present invention relates to primer compositions and more specifically the present invention relates to primer compositions for room temperature vulcanizable silicone rubber compositions.

Primer compositions for adhering various materials to substrates is well known. The function of the primer composition is that when a composition does not adhere to a substrate by being placed thereon by mechanical reaction, there is applied a primer composition to the substrate and the composition is applied thereover such that the composition that is applied over the substrate has a stronger adherence to the substrate than was the case previously.

Primer compositions for room temperature vulcanizable silicone rubber compositions and heat vulcanizable silicone rubber compositions are well known. However, recently there has entered an innovation in the field—self-bonding room temperature vulcanizable silicone rubber compositions and self-bonding heat vulcanizable silicone rubber compositions have been developed. Briefly, such self-bonding compositions eliminate the need for a primer to adhere the composition to metal, masonry or plastic substrates by the insertion of a self-bonding ingredient in the uncured compositions.

It should be mentioned here as is probably well known to a worker skilled in the art that room temperature vulcanizable silicone rubber compositions comprise a two component system which when the two components are mixed and applied over a substrate will cure to a silicone elastomer. The one-component room temperature vulcanizable silicone rubber compositions are those compositions which are prepared to a single mixed component in an essentially anhydrous state and then the composition is applied to a substrate and in the presence of atmospheric moisture it cures to a silicone elastomer. The insertion of various additives such as, nitrogen functional silanes, as that disclosed in Lampe/- Bessmer, U.S. Pat. No. 3,888,815, results in a self-bonding room temperature vulcanizable silicone rubber composition which will bond to various substrates without the need for a primer. The Lampe and Bessmer patent is hereby incorporated into the present case by reference.

In the same way, various types of one-component room temperature vulcanizable silicone rubber compositions have been devised which have self-bonding ingredients mixed into the composition such that the composition can be applied over a substrate such as, a masonry, concrete or a plastic substrate and adheres to the substrate with superior adherence when it is cured to a silicone elastomer in the absence of a primer. Such self-bonding compositions have also been devised for heat vulcanizable silicone rubber compositions which incorporate in them a silyl isocyanurate or a silyl maleate as a self-bonding additive such that the heat vulcanizable silicone rubber composition upon being heated at elevated temperatures to cure it, will bond to a masonry, plastic or metal substrate in the absence of a primer.

As a worker skilled in the art knows, a heat vulcanizable silicone rubber composition is one having a linear diorganopolysiloxane polymer gum having a viscosity of 1,000,000 to 200,000,000 centipoise at 25° C., and which may have some vinyl unsaturation in it and which is cured in the presence of a peroxide catalyst to a silicone elastomer, which curing takes place at elevated temperatures, such as temperatures above 100° C. The only difficulty with such self-bonding silicone compositions is that they are usually a very complex type of system and they require the addition or presence in the composition of very complex chemical self-bonding additives, which unduly increase the cost of the composition.

Another disadvantage is that in some cases such self-bonding silicone compositions, without the use of a primer, do not have as high an adherence to the substrate as would be desired; for instance, in the situation where the cured silicone elastomer is under water immersion for a substantial period of time.

Accordingly, in spite of such self-bonding silicone composition it is still desirable to have an effective primer composition for silicone compositions that are not self-bonding but through the use of said primer composition adhere the silicone composition to whatever substrate with a high level of adherence.

It is especially advantageous to have an effective primer composition for all different types of silicone compositions and more specifically for some of the more simpler formulated one-component room temperature vulcanizable silicone rubber compositions or two-component room temperature vulcanizable silicone rubber compositions which do not have self-bonding additives in them and which will at a minimum expense adhere them to a variety of substrates especially when the substrate and the cured silicone composition is to be subjected to a large amount of water immersion.

As a pertinent prior art of such primer composition reference is made to the U.S. patent of Bylsma entitled "Primer for Room Temperature Vulcanizing Polyurethanes", U.S. Pat. No. 3,453,136. It should be noted that the primer composition of this patent is disclosed to be effective for bonding room temperature vulcanizable polyurethane to substrates such as, glass, aluminum, stainless steel, concrete and marble. Nowhere does this patent disclose that its primer composition could be utilized for bonding room temperature vulcanizable silicone rubber compositions or even, for that matter, heat vulcanizable silicone rubber compositions. In addition, nowhere does the patent mention the bonding of room temperature vulcanizable polyurethanes to plastics. Although the patent specifies that the primer composition can be utilized to bond polyurethane to various substrates, the only substrates that are disclosed for such bonding are specifically, glass, aluminum, stainless steel, mild steel, concrete and marble. Nowhere does the foregoing Bylsma patent disclose that its primer composition is suitable for the bonding of polyurethane compositions or any other type of composition to plastic substrates. Accordingly, it was highly unexpected to discover that the Bylsma composition was highly effective for bonding silicone rubber compositions to various substrates and was specifically an excellent primer composition for bonding room temperature vulcanizable silicone rubber compositions to plastics and more specifically to polystyrene and that such bond had a great resistance to degradation even under substantial immersion under water at room temperature or at elevated temperatures. It should also be noted with respect to the Bylsma composition that while it was highly suitable for bonding room temperature vulcanizable silicone rubber compositions and heat vulcanizable silicone rubber compositions to plastic substrates, nevertheless, when utilized against metal substrates its adherency was not as much as would be desired.

Accordingly, it was highly desirable to improve the primer composition of the Bylsma patent such that the primer composition would function in a superior manner to bond silicone compositions and more specifically room temperature vulcanizable silicone rubber compositions not only to plastic substrates but also to metal.

Accordingly, it is one object of the present invention to provide for a method for bonding room temperature vulcanizable silicone rubber compositions to plastic substrates utilizing an acrylate functional primer composition.

It is another object of the present invention to provide for a method for bonding room temperature vulcanizable silicone rubber compositions to plastic substrates which primer composition produces a superior bond between the cured silicone composition and the plastic substrate even when the bond was exposed to a substantial amount of water immersion.

It is an additional object of the present invention to provide for an improved primer composition for room temperature vulcanizable silicone rubber compositions so as to bond such compositions with superior adhesion both to plastic and metal substrates.

It is still an additional object of the present invention to provide for an improved primer composition which will bond room temperature vulcanizable silicone rubber compositions with superior adhesion to metal and plastic substrates even under water immersion.

These and other objects of the present invention are accomplished by means of the disclosure set forth herein below.

SUMMARY OF THE INVENTION

There is provided in accordance with the foregoing objects by the disclosure of the present invention, a method for adhering silicone compositions and more specifically room temperature vulcanizable silicone rubber compositions to plastic substrates and more specifically, polystyrene, comprising applying to said substrate a layer of the reaction product of a reaction mixture of methyl methacrylate or butyl acrylate or butyl methacrylate, and an acrylate silane of the formula,

in an organic solvent where X is selected from the class consisting of

and
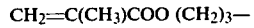

where X is a hydrolyzable radical wherein there is present prior to reaction from 1 to 12 mols of said methacrylate per mole of said acrylate silane and where there is present in said primer composition some of the unreacted acrylate silane and covering said primer layer with a room temperature vulcanizable silicone rubber composition which is cured by exposure to atmospheric moisture or with a heat vulcanizable silicone rubber composition. It should be noted that the foregoing reaction product is made by heating the primer ingredients at a temperature of 50° to 80° C. in the presence of a peroxide catalyst such as, benzoyl peroxide in an organic solvent which can be any solvent such as, xylene, toluene, benzene and ester solvents such as, methyl acetate, butyl acetate and etc. The X hydrolyzable radical is preferably an alkoxy radical although it may be any hydrolyzable radical such as, an acetoxy, amino, a chlorine group, and etc. It should be noted in the reaction mixture and in accordance with the foregoing mole percents of the acrylate silane to the methyl or butyl methacrylate, that is, the concentrations of the methyl methacrylate to the acrylate functional silane as disclosed above is within the ambient of concentrations, there is always in the reaction product some of the monomer silane or if all of the acrylate silane has reacted there is added additional acrylate functional silane. It should be noted that the primer composition composed solely of the reaction product of the methyl methacrylate or butyl acrylate and the acrylate functional silane will not function very effectively as a primer composition for silicone compositions.

Further, for adhering silicone compositions and more specifically room temperature vulcanizable silicone rubber compositions to plastic substrates with superior adhesion even under immersion under water and also with superior adhesion for silicone compositions such as, room temperature vulcanizable silicone rubber compositions, to metal substrates, even under immersion under water, there is provided by the present invention an improved primer composition comprising the reaction mixture of methyl methacrylate or butyl acrylate, or butyl methacrylate an acrylate silane of the formula,

where X is selected from the class consisting of

and

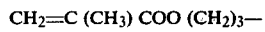

and where Y is a hydrolyzable radical and a vinyl containing silane or siloxane of the formula,

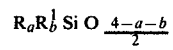

in an organic solvent wherein there is present prior to reaction 1 to 12 moles of said methyl methacrylate or butyl acrylate per mole of said acrylate silane and from 0.1 to 1 mole of said vinyl containing silane or siloxane per mole of said methyl methacrylate or butyl acrylate. In the above formulas, $R^1$ is vinyl and R is selected from the class consisting of alkyl radicals, aryl radicals, cycloalkyl radicals and fluoroalkyl radicals of 1 to 8 carbon atoms, a varies from 1 to 3, b is 1 or 2, and the sum of a+b cannot exceed 4. The foregoing reaction product is obtained by heating the foregoing silanes and methyl methacrylate or butyl acrylate or butyl methacrylate at elevated temperatures of between 50° to 80° C., the maximum temperature that the heating can be carried out being the boiling temperature of the methyl methacrylate or butyl acrylate and which heating is carried out in the presence of a free radical catalyst such as, a peroxide catalyst and more specifically, benzoyl peroxide. In the primer composition besides the reaction product there must be present some of the acrylate functional silane and desirably some of the vinyl-containing silane and siloxane. If the acrylate functional silane monomer is not present then the improved primer composition will not function as effectively as would be desired to bond silicone compositions to plastic and metal substrates.

The maximum adhesion characteristics of the improved primer composition is, of course, as stated previously, obtained when there is present in the primer composition some unreacted acrylate silane monomer as well as some unreacted vinyl-containing silane or vinyl-containing siloxane ingredient. However, the unreacted vinyl-containing silane or siloxane does not have to be present in the improved primer composition of the instant case. If some of the unreacted acrylate silane is present there will result an improved primer composition of the instant case to bond room temperature vulcanizable silicone rubber compositions and heat vulcanizable silicone rubber compositions with superior adherency to plastic and metal substrates.

There is also provided by the present invention a method for producing the improved primer composition by reacting at temperatures between 50° to 80° C. in the presence of a peroxide catalyst, the foregoing methyl methacrylate or butyl acrylate, or butyl methacrylate acrylate silane and a vinyl-containing silane or siloxane in the mole portions set forth hereinbefore. This reaction and process is of necessity carried out in a solvent and more specifically in an organic solvent in which the reactants are soluble. The most preferred solvent being the ester solvents such as, the acetates—methyl acetate, isopropyl acetate and isobutyl acetate being the most preferred of the ester organic solvents.

DESCRIPTION OF THE PREFERRED EMBODIMENT

As a necessary ingredient in the primer composition of the instant case there must be present methyl methacrylate or butyl acrylate. Preferably, in the reaction product that is obtained in the invention of the instant case, there is utilized only methyl methacrylate or butyl acrylate or butyl methacrylate. However, up to 50% of the methyl or butyl methacrylate utilized to obtain the reaction product (the percentage being by weight) can be substituted by another type of acrylate such as, ethyl acrylate and 2-ethylhexylacrylate. As stated previously, in the most preferred embodiment of the instant invention the acrylate monomer is substantially all methyl methacrylate or butyl acrylate. However, up to 50% by weight of such methyl methacrylate or butyl acrylate or butyl methacrylate may be substituted by other acrylates without detracting from the advantageous properties of the primer composition of the instant case. It should be noted that butyl acrylate or butyl methacrylate may be substituted in total for methyl methacrylate in the composition of the instant case contra to the disclosure of U.S. Pat. No. 3,453,136. However, none of these acrylates can be substituted in total by ethyl methacrylate since the composition loses its effectiveness.

The other necessary ingredient in the invention of the instant case is the acrylate functional silane. The hydrolyzable Y groups in such acrylate functional silanes may be any hydrolyzable groups which are well known in the art such as, for instance, halogen groups, alkoxy groups, acyloxy groups, aryloxy groups, oxime groups or amine groups or such groups such as amide groups, ketoximino groups, tert-alkoxy groups such as, for instance, tert-butoxy hydrolyzable groups. Simply stated, the Y substituent group may stand for any hydrolyzable group which is readily hydrolyzed by water. An example of such groups which Y may represent in the above formula, (thformula of the acrylate functional silane) are, for instance, chlorine, bromine, fluorine atoms, methoxy, ethoxy, propoxy, butoxy, acetoxy, phenoxy, amino, amido and etc. In the most preferred embodiment of the instant case, the Y radical on the acrylate functional silane simply stands for an alkoxy or halogen atom such as, methoxy or chlorine.

The production of such acrylate functional silanes is known in the art, since the acrylate functional silanes of the instant invention may be prepared by reacting a silane of the formula,

where Y is as previously defined with an olefinic containing acrylate, that is, an acrylate containing at least two olefinic groups, and such hydrogen silane is reacted with the double olefinic containing acrylate in the presence of a platinum catalyst. Such reactions are well known in the art as evidenced by the Bailey et al, U.S. Pat. No. 2,970,150. Of course, the platinum catalyst is not limited for utilization in such reactions as disclosed in Bailey et al and can be any platinum complex, such as that obtained by reacting chloroplatinic acid with an organic olefinic compound or with an olefinic containing silicone compound.

Under such conditions which may be carried out at room temperature or at elevated temperatures such as 100° to 200° C., the hydrogen atom of the silane adds on to the additional olefinic group in the carylate to produce the desired acrylate functional silane. Of course, it should be noted that any suitable procedure for preparing such acrylate functional silanes may be utilized to produce the acrylate functional silanes of the instant invention. To obtain the reaction product of the instant invention, the acrylate functional silane is simply reacted with the methyl methacrylate or butyl acrylate or a mixture of methyl and butyl acrylate and optionally with minor amounts of other acrylates in the presence of a free radical catalyst to produce the desired reaction product within the scope of the instant invention. Preferably, in such reaction product there is utilized from 1 to 12 moles of the methyl methacrylate or butyl acrylate per mole of the acrylate functional silane. Substantially enough methyl methacrylate or butyl acrylate is utilized to be completely utilized in its reaction to add on to the acrylate functional silane so as to form the desired reaction product. Although molar concentrations of the methyl methacrylate to the acrylate functional silane can be utilized outside of the above ranges, no useful purpose is served in that either the reaction product does not have the proper primer properties, that is, there is a decrease in the optimization of the primer properties or the additional methyl methacrylate or butyl acrylate serves no useful purpose in the primer composition. It should be noted that in such a reaction product, it is necessitated that there be in the primer composition some of the acrylate functional silane monomer, that is, unreacted acrylate functional silane. Otherwise, the primer composition will not have suitable properties unless some unreacted acrylate functional silane is added to the reaction product. Accordingly, it is desired that the primer composition have at least 10% by weight of the unreacted acrylate functional silane base on the total weight of the acrylate functional silane and the reaction product in the primer composition.

Accordingly, if too much of the acrylate functional silane is consumed to produce the reaction product, as disclosed herein above, then it may be necessary to add an additional acrylate functional silane monomer to the primer composition so that the primer composition will have the desirable optimum primer properties.

It should be noted that a primer composition comprised solely of the reaction product and having no acrylate functional silane monomer in the primer compositions does not function very effectively as a primer composition within the scope of the instant invention. Accordingly, at least 10% of the solids content of the primer composition is composed of an unreacted acrylate functional silane monomer and more preferably 10 to 30% by weight of the solids content of the primer composition of the instant case is composed of an unreacted acrylate functional silane. Although amounts such as 5% by weight or less of the acrylate functional silane can be present in the primer composition based on the total weight of the reaction product and the acrylate functional silane, the priming properties of the primer composition is not optimized at that low level.

The primer composition of the instant case is obtained by dissolving the acrylate functional silane and the methyl methacrylate or butyl acrylate and optionally other acrylates in a suitable organic solvent so that the ingredients can react with each other, preferably, at elevated temperatures. The organic solvent that may be utilized may be any organic solvent in which the methyl methacrylate or butyl acrylate and the acrylate functional silane are soluble in. Examples of such solvents being hexane, heptane and octane, cyclohexane, chlorinated hydrocarbon solvents, toluene, xylene, benzene, an ester type of solvents such as, methyl acetate, isopropyl acetate, butyl acetate and etc. The most preferred organic solvents for utilization to produce a primer composition within the scope of the instant case is the ester solvents and more specifically the methyl, ethyl, propyl and butyl acetate solvents. Preferably, enough solvent is utilized such that the solids content of the ingredients in the organic solvent varies anywhere from 5 to 50% by weight dissolved in the organic solvent. The desired reaction product is then simply obtained by reacting the methyl methacrylate or butyl acrylate with the acrylate functional silane in the presence of a free radical catalyst as dissolved in the organic solvent by heating the reaction mixture at a temperature of preferably 50° to 120° C. for a period of time varying anywhere from ½ to 3 hours, or preferably from 1 to 2 hours. After cooling the reacted mixture the solvent solution is simply cooled and after adjusting to the appropriate solids content and adding if necessary some unreacted acrylate functional silane, the composition may be utilized as a primer.

As far as the catalyst for initiating the reaction, it may be any free radical catalyst but is most preferably a peroxide catalyst such a preferred peroxide catalyst being, for instance, benzoyl peroxide.

Other peroxide catalysts that may be utilized to produce the primer composition of the instant case are, for instance, those set forth in U.S. Pat. No. 3,919,161 whose disclosure is incorporated into the present case by reference.

The preferred curing agents are organic peroxides conventionally used to cure silicone elastomers. Especially suitable for the dialkyl peroxides which may have the structural formulas,

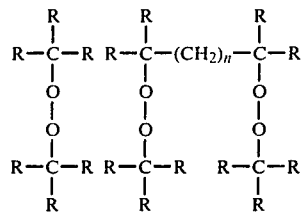

wherein R represents the same alkyl group throughout, or alkyl groups of two or more diffierent types and n is two or a larger integer.

Among the specific peroxide curing catalysts that are preferred are di-tertiary-butyl peroxide, tertiarybutyl-triethylmethyl peroxide, 2,2'-bis(t-butylperoxy)diisopropyl benzene and di-tertiary alkyl peroxide such as dicumyl peroxide. Other suitable peroxide catalysts which effect curing through saturated as well as unsaturated hydrocarbon groups on the silicon chain are aryl peroxides which include benzoyl peroxides, mixed alkyl-aryl peroxides which include tertiary-butyl perbenzoate, chloroacyl peroxides such as 2,4-dichlorobenzoyl peroxide, monochlorobenzoyl peroxide, benzoyl peroxide, etc. Generally, 0.1–8 percent of said peroxide, by weight of the total ingredient ingredients minus the solvent is used and preferably 0.5–3.0 percent by weight. It should be noted that the peroxide catalyst need not be held to the strict concentration ranges set forth herein above.

Although ranges outside the above peroxide catalyst may be utilized to produce the primer composition of the instant case, no advantage is obtained. It is desired that no more than 8% of said peroxide be used by weight of the methyl methacrylate or butyl acrylate and the acrylate functional silane in the reaction mixture since the additional peroxide serves no useful purpose. It should be noted that a catalyst is not strictly necessary to produce the primer composition of the instant case although it is highly desirable since it effectively speeds up the rate of reaction than is the case when the methyl methacrylate or butyl acrylate and acrylate functional silane are reacted with each other in the absence of a catalyst.

It should be noted that useful primer compositions can be obtained by reacting the methyl methacrylate or butyl acrylate with the acrylate functional silane at elevated temperatures of 50° to 80° C. in the absence of a catalyst, although in that situation elevated temperatures are needed to cause the acrylate functional silane to react with the methyl methacrylate or butyl acrylate monomer.

Accordingly, in a very general sense, the reaction temperature that may be utilized to produce the primer composition of the instant case may vary anywhere from 25° C. to 80° C., but should not exceed the boiling temperature of the methyl methacrylate or butyl acrylate, otherwise, the methyl methacrylate or butyl acrylate will be stripped off and will not react appropriately with the acrylate functional silane. When a peroxide catalyst is utilized, especially at high concentrations, the reaction temperature may be in the neighborhood of 30° to 50° C. and there can still be obtained a suitable primer composition within the scope of the instant case.

In the most preferred embodiment the peroxide catalyst is utilized at suitable concentrations and the reaction is carried out at elevated temperatures of 50° to 120° C. to obtain the reaction product primer composition at the quickest possible rate. It should be noted that the primer composition having therein as well some of unreacted acrylate functional silane monomer at the concentrations noted above may be cut to the appropriate amount of solids such as, anywhere from 5 to 50% by weight of solids, and applied to a substrate as is. The substrate should be cleaned first before the application of the primer composition, then the primer composition is applied thereover, and allowed to dry for about anywhere from 5 to 30 minutes and then the silicone composition is then applied thereover to cure to a silicone elastomer which adheres with a high level of adhesion to the substrate.

It has been found that the foregoing primer composition is of a great advantage in adhering silicone compositions to various plastics such as acrylo nitrile, butadiene styrene plastics, acrylic plastics, cellulose acetate plastics, polycarbonate plastics, polyvinylchloride plastics, and styrene plastics. The only plastic in which it was found that the instant primer composition did not adhere to silicone compositions that were tested was nylon. However, in all other plastics that were tested, there was found that the foregoing primer composition had superior binding properties of adhering silicone compositions to the plastic substrate and especially in tests where the plastic and silicone composition composite was subjected to water immersion. It should be noted, as stated previously, that the foregoing reaction product primer composition may be further improved for adhering silicone compositions to metals by incorporating and reacting the methyl methacrylate or butyl acrylate with the acrylate functional silane and also reacting it with the vinyl containing polysiloxane or silane. The conditions for reaction are much the same as stated previously for the reaction of just the acrylate functional silane with the methyl methacrylate or butyl acrylate monomer. The vinyl-containing silane or siloxane within the scope of the foregoing formula set forth hereinbefore. In the formula where R' is vinyl, R is selected anywhere from the class consisting of monovalent hydrcarbon radicals and halogenated monovalent hydrocarbon radicals such as, alkyl radicals, methyl, ethyl, propyl and etc.; cycloalkyl radicals such as, cyclohexyl, cycloheptyl, cyclooctyl; aryl radicals such as, phenyl, methylphenyl, ethylphenyl and 3,3-trifluoropropyl radicals. Most preferably, the R radical is selected from the class consisting of alkyl radicals, aryl radicals, cycloalkyl radicals and fluoroalkyl radicals of 1 to 8 carbon atoms. Acrylate functional silanes and siloxanes that may be utilized to produce an advantageous primer composition within the scope of the instant case are, for instance, tetramethyldivinyldisiloxane and methylvinyltetracyclicsiloxane. The siloxanes which come within the scope of the foregoing formula, that is, the vinyl-containing siloxanes which come within the scope of the foregoing formula, must be low molecular weight siloxanes such as, cyclicsiloxanes or disiloxanes or trisiloxanes, which preferably have at least one vinyl radical attached to each silicon atom. Such vinyl-containing silanes and siloxanes are well known in the art and are produced by the hydrolysis of vinylchlorosilanes in the appropriate amounts and by simply crackling the hydrolyzate there can be distilled overhead the desired vinyl containing cyclictetrasiloxane or cyclictrisiloxane.

It should also be mentioned at this point that vinyl-containing silanes can also be utilized with advantage in the instant invention such as, vinyltrimethylsilane, divinyldimethylsilane and etc. Such vinyl-containing silanes and siloxanes are reacted to produce a primer composition within the instant case in much the same manner as the methyl methacrylate or butyl acrylate was reacted with the acrylate functional silane. The only difference being in the instant reaction mixture where there is utilized the methyl methacrylate or butyl acrylate and the acrylate functional silane in the foregoing molar proportions given previously and further where there is present in the reaction mixture from 0.1 to 1 mole of the vinyl-containing silane or siloxane per mole of the methyl methacrylate or butyl acrylate.

As stated previously, although ranges outside the above may be utilized for the concentration of the vinyl-containing silane and vinyl-containing siloxane no great advantages are obtained by going outside the above molar proportions, and the reaction conditions are much the same in that peroxide catalysts also may be utilized in this reaction to produce this primer composition at the concentrations given previously. The concentration of the peroxide catalyst as given before is based on the total weight of the acrylate functional silane, the methyl methacrylate or butyl acrylate and the vinyl-containing silane or siloxane. The temperature reaction is again preferably between 50° to 120° C. at a period of time from anywhere from $\frac{1}{2}$ hour to 3 hours and more preferably 1 to 2 hours in the presence of the peroxide catalyst, the peroxide catalyst being again the preferred benzoyl peroxide or dicumyl peroxide. Again the reaction is carried out in an organic solvent and the same types of organic solvents as disclosed previously for the reaction product of the methyl acrylate with the acrylate functional silane. Again, in the foregoing reaction product or by subsequent addition or through the reaction itself there must be present at least 10% by weight of the total reaction product of the acrylate functional silane if the primer composition is to function effectively and have optimum primer properties for binding silicone compositions to metal substrates as well as plastic substrates. There is also desirable in the reaction product mixture some unreacted vinyl-containing silane or vinyl-containing siloxane which enhances the properties of the primer composition. It has been found when the foregoing primer composition which is a reaction product of methyl methacrylate or butyl acrylate, an acrylate functional silane and a vinyl-containing silane or siloxane, then the resulting primer composition which can be utilized at any solids concentration desired is very effective in binding silicone compositions to metals as well as to the foregoing plastic substrates mentioned previously.

Examples of such metals are, for instance, aluminum, steel, copper, brass, various other metal substrates. It also has been found that the foregoing primer composition which is the reaction product of the foregoing three ingredients may also bind silicone compositions with advantage to masonry surfaces such as, concrete, and that such bonds produced by the primer composition of the instant case resist hydrolytic degradation even when they are immersed under water for periods of time as long as 1 year or more.

The second primer composition is applied in much the same way as the first primer composition in that it is simply dissolved in the solvent in which it was prepared or dissolved in another solvent as is desired, and cut or prepared to the appropriate solids content which may be anywhere from 5 to 50% solids content in the organic solvent. The primer composition is simply applied to a clean plastic, metal or masonry surface and allowed to dry over a period of time of anywhere from 5 to 60 minutes. After the primer composition has dried, then the silicone composition is applied thereover and allowed to form a silicone elastomer as is well known in the art.

It should be noted that the silicone composition can be applied directly over the primer compositions of the instant case immediately after the primer composition is applied to the substrate. However, for optimum binding properties of the primer composition it is desirable that the solvent from the primer composition evaporate before the silicone composition is placed thereon. Although the silicone composition can be applied directly over the undried primer composition, the adhesive properties of the primer composition are not optimized. It should be mentioned here that the process and conditions as well as the type of catalyst and reaction conditions that have been recited for the production of the primer composition, that is, the reaction product of methyl methacrylate or butyl acrylate and an acrylate functional silane apply to the method for preparing the second primer composition which is the reaction product of the methyl methacrylate or butyl acrylate, the acrylate functional silane and vinyl-containing silane or siloxane as described previously.

In the second primer composition, that is, the one which contains the reaction product of also the vinyl-containing silane or vinyl-containing siloxane, there must be present in such primer compositions some unreacted acrylate functional silane and more desirably at least 10% by weight of unreacted acrylate functional silane. It has been found that the second primer composition which is the reaction product also of a vinyl-containing silane or siloxane has preferred optimum adherence of silicone compositions not only plastic substrates but has optimum adherence of silicone compositions to also metal and masonry substrates. Silicone compositions with which the above primer may be utilized are well known and are varied. For instance, there may be utilized a heat vulcanizable silicone rubber composition with the foregoing primer composition which heat vulcanizable silicone rubber composition is, for instance, the one disclosed in the foregoing Claister, U.S. Pat. No. 3,919,161 which is hereby incorporated into the present case by reference. Basically such heat vulcanizable compositions comprise a linear diorganopolysiloxane polymer having a viscosity of 1,000,000 to 200,000,000 centipoise at 25° C., an extending filler or a reinforcing filler such as, fumed silica or precipitated silica, various other additives such as, flame retardant additives and heat aging additives, and a peroxide catalyst. The composition is simply applied to the prime substrate and heated at elevated temperatures of above 100° to 250° C. to form the silicone elastomer to which the primer composition of the instant case will bind to the foregoing substrates with maximum and superior adhesiveness.

Another type of silicone composition with which the instant primer compositions may be utilized are, for instance, two component room temperature vulcanizable silicone rubber compositions. Such compositions comprise a silanol-terminated diorganopolysiloxane polymer having a viscosity of anywhere from 1,000 to 500,000 centipoise at 25° C., a reinforcing filler, (and opionally an extending filler) such reinforcing fillers being selected from fumed silica and precipitated silica, an alkyl silicate cross-linking agent and a metal salt of a carboxylic acid as the catalyst. The foregoing two component system is packaged in that the silanol diorganopolysiloxane polymer is packaged with a filler and the alkyl silicate crosslinking agent is packaged with the catalyst. When it is desired to cure the composition, the two ingredients are immediately mixed and applied to whatever substrate that is primed by the primer composition of the instant case. The resulting mixture cures to a silicone elastomer in a period of time varying anywhere from $\frac{1}{2}$ hour to 24 hours. There are other optional ingredients which can be utilized in such a composition. As examples of such a two-component system, reference is made to the patent of Lampe U.S. Pat. No. 3,696,090, whose disclosure is hereby incorporated by reference. Another type of silicone composition in which the present primer compositions may be utilized with, are for instance, one-component room temperature vulcanizable silicone rubber compositions such as those disclosed in the U.S. Pat. of Harvey P. Shaw, No. 3,701,753, which is hereby incorporated into the present case by reference. Such one-component systems generally comprise a silanol-terminated diorganopolysiloxane polymer of a viscosity of anywhere from 1,000 to 500,000 centipoise at 25° C., a reinforcing or extending filler, or both, a cross-linking agent which may be selected from an acyloxy functional silane, an alkoxy functional silane, an amine functional silane, an amide functional silane or a ketoximino functional silane. There is also added a metal salt of a carboxylic acid as a catalyst or a titanium chelate catalyst. Such compositions are mixed and stored in the absence of moisture. When the composition is applied over the primed surface and exposed to atmospheric moisture the composition cures to a silicone elastomer in a period of time varying anywhere from a period of 1 to 24 hours. Other silicone compositions with which the primer composition may be utilized are, for instance, those disclosed in the Jeram/Striker, U.S. Pat. No. 3,884,866. The foregoing Jeram/Striker patent illustrate an SiH olefin platinum catalyzed composition which forms a silicone elastomer.

The examples below are given for the purpose of illustrating the reduction to practice of the instant invention. They are not given for any purpose of delineating the scope of the instant specification and claims. All percentages and all parts in the examples are by weight.

EXAMPLE 1

In the following examples there was utilized the same one-component room temperature vulcanizable silicone rubber composition which for purposes herein will be referred to as RTVX. Such one component silicone composition was formed by mixing 100 parts of 500 centipoise viscosity silanol end-stopped dimethylpolysiloxane polymer, 20 parts by weight of octamethylcyclictetrasiloxane treated fumed silica, and 15 parts of a silanol oil composed of trimethylsiloxy monofunctional units, dimethylsiloxy difunctional units and methylsiloxy trifunctional units which oil had a viscosity of 45 centipoise at 25° C. and a silanol content of 0.5 weight percent.

To 100 parts of this base mixture there was mixed 4 parts of a catalyst composition which was prepared by mixing 99.4 parts by weight of methyltriacetoxysilane, and 0.6 parts of dibutyl tin dilaurate. The resulting mixture is stored in an anhydrous state and when exposed to atmospheric moisture it cures to a silicone elastomer in a period of time varying from 1 hour to 24 hours. RTVX is a simplified one-component room temperature vulcanizable silicone composition which has many uses but which is exemplary of silicone compositions which are generally not self-bonding and on which primer compositions have to be utilized in some situations to bind the silicone elastomer to a particular substrate.

There was prepared a primer composition A, which was prepared by mixing 300 parts by weight of methyl methacrylate monomer, 60 parts of methylacryloxypropyltrimethoxysilane, 7.0 parts of 98% benzoyl peroxide and 700 parts of ethyl acetate which mixture was reacted at elevated temperatures. There was then prepared primer composition B which comprised mixing 2.0 parts of methyl methacrylate monomer, 0.4 parts of methylacryloxypropyltrimethoxysilane, 0.2 parts of tetramethyldivinyldisiloxane, 0.1 part of benzoyl peroxide and 20 parts of ethyl acetate which mixture was reacted at elevated temperatures. There was then prepared a primer composition C which comprised 1.0 parts of methylvinyltetracyclicsiloxane, 2.0 parts of methyl methacrylate monomer, 0.6 parts of methylacryloxypropyltrimethyoxysilane, 0.1 part of benzoyl peroxide and 20 parts of ethyl acetate, all of which were reacted at elevated temperatures. All primer compositions A, B and C were polymerized at a temperature of 80° to 85° C. under reflux with a nitrogen gas purged to eliminate moisture for a period of time varying anywhere from 1 to 2½ hours. Primer compositions A, B and C were then cooled to room temperature and cut to 8.5% solids with additional ethyl acetate in all cases. All these primer compositions were then coated individually over high impact polystyrene and allowed to dry 30 minutes at 25° C., then the RTVX was applied over the primer approximately ⅛ of an inch thick. After the RTVX was allowed to cure 48 hours at 25° C. and 50% relative humidity all three primers gave excellent adhesion with 100% cohesive failure.

Primer composition A was also utilized to prime a plastic which was composed of 78% of acrylonitrile butadiene styrene plastic with 22% of polyvinylchloride mixed into it. One sample of this plastic was primed with the primer composition A and one panel of the plastic was not so coated. The primed panel gave excellent adhesion and 100% cohesive failure while the unprimed sample gave fair adhesion with 100% adhesive failure. Another plastic panel of acrylonitrile butadiene styrene plastic was again primed with primer composition A, over which there was applied a layer of RTVX ⅛ of an inch thick. The primed panel gave excellent adhesion with 100% cohesive failure while the unprimed sample gave fair adhesion with 100% adhesive failure.

Finally, RTVX was applied to primed samples, primed with composition A, which was composed of a plastic formed from 55% by weight of polyvinylchloride and 45% of acrylonitrile butadiene styrene plastic. The primed panel gave excellent adhesion with 100% cohesive failure while the unprimed panel gave fair adhesion with 100% adhesive failure.

EXAMPLE 2

Primer composition A of Example 1 was also tested for dry adhesion and also for wet adhesion on the following plastic substrates which consisted of ABS (acrylonitrile butadiene styrene) plastic, acrylic plastic, cellulose acetate, Noryl, which is a registered trademark for polyphenyleneoxide/styrene plastic carbonate plastic, polyvinylchloride plastic and styrene plastic. Primer Composition A was compared with the control which did not use any primer for the adherence of RTVX of Example 1, and in which test there was utilized a primer composition Z for comparison which was a primer composition of the prior art.

The prior art Primer Z composition is a blend of an acrylic resin, a methylsiloxy trifunctional silicone resin, ethylorthosilicate, ferric chloride, which ingredients of the prior art composition were dissolved in a solid mixture of 1,1,1-trichloroethane and an isopropanol mixture in which the solids content of the primer Z composition was 10% by weight. The solid content of primer composition A was 7.5% by weight. The peel specimens, both wet and dry, were a standard 2.5×20 millimeters (1"×8") plastic panels used with stainless steel screens with approximately 2.5 millimeters (100 mils) RTVX total thickness. The primed panels were allowed to dry 30 minutes at 25° C. at 77° F. at 50% relative humidity and the RTVX was allowed to dry for 5 days before the adhesion was tested. The results of these tests are as follows:

TABLE 1

| Plastic Substrate | EVALUATION OF PRIMER FOR HYDROLYTIC STABILITY | | | | | | | | | | | | | | | | |
|---|---|---|---|---|---|---|---|---|---|---|---|---|---|---|---|---|---|
| | Dry Peel Adhesion[1] Kg/cm (Lbs/In) & % Cohesive St. | | | | | | | | | 4 Weeks Water Immersion At 63° C. (145° F.) (Lbs/In) & % Cohesive St. | | | | | | | |
| | Control | | | 2 | | | Comp. A | | | Control | | | 2 | | | Comp. A | |
| ABS | 8 | (43) | 100 | 7 | (40) | 100 | 8 | (43) | 100 | 0 | — | | 1 | ( 8) | 15 | 5 | (30) | 100 |
| Acrylic | 3 | (16) | 10 | 8 | (43) | 100 | 8 | (47) | 100 | 0 | — | | 3 | (20) | 10 | 7 | (40) | 100 |
| Cellulose Acetate | 3 | (17) | 100 | 1 | ( 6) | 10 | 6 | (33) | 100 | 4 | (23) | 100 | 0 | — | — | 5 | (30) | 100 |
| Noryl(R) | 8 | (47) | 100 | 1 | ( 5) | 10 | 7 | (42) | 100 | 5 | (26) | 10 | 0 | — | — | 5 | (32) | 100 |
| Polycarbonate | 6 | (36) | 100 | 3 | (18) | 50 | 8 | (43) | 100 | 0 | — | — | 3 | (20) | 15 | 5 | (32) | 100 |
| PVC | 5 | (30) | 100 | 2 | (10) | 10 | 5 | (31) | 100 | 3 | (20) | 10 | 0 | — | — | 5 | (30) | 100 |
| Styrene | 5 | (26) | 10 | 0 | 0 | | 5 | (30) | 100 | 0 | — | — | 0 | — | — | 4 | (24) | 100 |

[1]Peel specimens - standard 2.5 × 20 mm (1" × 8") plastic panels, using stainless steel screens with approx. 2.5mm (100 mils) RTVX total thickness. Primed panels allowed to dry 30 minutes at 25° C. (77° F.) 50% relative humidity for 5 days.

The above table gives the adhesion strength in killograms per centimeter or equivalent in lbs./in) and the percent cohesive strength of the bond. The control panel had no primer on it, on which the RTVX was applied, while the prior art primer 2 was applied over the plastic panels on which RTVX was applied and compared with a panel which was primed with primer Composition A of Example 1. It should be noted that the wet peel adhesion was measured for 4 weeks in water immersion at 63° C. or 145° F. The above results clearly indicate that the primer compositions of the instant case were considerably superior over the prior art primer compositions binding silicone compositions and specifically room temperature vulcanizable silicone rubber compositions to various plastic substrates, especially so, in underwater immersion.

EXAMPLE 3

There was prepared a primer composition by reacting 40 parts of N-butyl acrylate, 14 parts of methacryloxypropyl triethoxysilane and 3 parts of benzoyl peroxide which were dissolved in 600 parts of ethyl acetate. The foregoing reactants were reacted at 78° C. for 7 hours. Then the solution was adjusted 7.5% by weight of solids.

The foregoing primer composition was utilized to bond RTVX of Example 1 to polystyrene and anodized aluminum. After that, the samples were immersed under water wherein the water was maintained at 70° C. After two weeks of underwater immersion, the samples gave 100% cohesive failure.

I claim:

1. A method for adhering silicone compositions to plastic substrates comprising (a) applying to said substrate a layer of (1) the reaction product of a reaction mixture of an alkyl acrylate or alkyl methacrylate where the alkyl group can be methyl or butyl and mixtures thereof and of an acrylate silane of the formula, $$X \; Si \; Y_3$$

in an organic solvent where X is selected from the class consisting of $$CH_2=CHCOO(CH_2)_3-$$

and $$CH_2=C(CH_3)COO(CH_2)_3-$$

and Y is a hydrolyzable radical wherein there is present prior to reaction from 1 to 12 mols of said methacrylate per mole of said silane, and (2) a silane of the formula, $X \; Si \; Y_3$ where X and Y are as specified above, and (b) covering said layer with a silicone composition.

2. The method of claim 1 wherein further said reaction product also has as an ingredient a vinyl-containing silane or siloxane of the formula, $$R_a R'_b SiO \frac{4-a-b}{2}$$

where R' is vinyl and R is selected from the class consisting of alkyl radicals, aryl radicals, cycloalkyl radicals and fluoroalkyl radicals of 1 to 8 carbon atoms, a varies from 1 to 3, b is 1 to 2 and the sum of a+b cannot exceed 4.

3. The method of claim 2 wherein the vinyl-containing silane or siloxane is present at a concentration of 0.1 to 1 mole per mole of the methyl methacrylate.

4. The method of claim 1 wherein the reaction product is obtained by heating the reaction mixture at a temperature of 50°-80° C. in the presence of a peroxide catalyst.

5. The method of claim 4 wherein the peroxide catalyst is benzoyl peroxide.

6. The method of claim 1 wherein the organic solvent is an ester.

7. The method of claim 6 wherein the ester is selected from the class consisting of methyl acetate, isopropyl acetate and isobutyl acetate.

8. The method of claim 1 wherein Y is selected from the group consisting of alkoxy radicals and aryloxy radicals of 1 to 8 carbon atoms.

* * * * *